US009116246B2

(12) United States Patent
Osinski et al.

(10) Patent No.: US 9,116,246 B2
(45) Date of Patent: Aug. 25, 2015

(54) THERMAL NEUTRON DETECTORS BASED ON GADOLINIUM-CONTAINING NANOSCINTILLATORS

(75) Inventors: Marek A. Osinski, Albuquerque, NM (US); Brian A. Akins, Edgewood, NM (US); John B. Plumley, Albuquerque, NM (US); Antonio C. Rivera, Belen, NM (US); Gennady A. Smolyakov, Albuquerque, NM (US); Jose M. Vargas, New Orleans, LA (US); Nathan J. Withers, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 326 days.

(21) Appl. No.: 13/506,240

(22) Filed: Apr. 5, 2012

(65) Prior Publication Data

US 2012/0286166 A1  Nov. 15, 2012

Related U.S. Application Data

(60) Provisional application No. 61/473,071, filed on Apr. 7, 2011.

(51) Int. Cl.
*G01T 3/06* (2006.01)
(52) U.S. Cl.
CPC ........................ *G01T 3/06* (2013.01)
(58) Field of Classification Search
CPC ....................................................... G01T 3/06
USPC .................................................... 250/390.11
See application file for complete search history.

(56) References Cited

U.S. PATENT DOCUMENTS

| 7,652,261 | B1* | 1/2010 | Wilson et al. | 250/370.11 |
| 2007/0217996 | A1* | 9/2007 | Levy et al. | 424/1.33 |
| 2008/0093557 | A1* | 4/2008 | Cooke et al. | 250/361 R |
| 2009/0302195 | A1* | 12/2009 | Muenchausen et al. | 250/200 |
| 2011/0204244 | A1* | 8/2011 | Haard et al. | 250/369 |

OTHER PUBLICATIONS

K. Banerjee et al., "Characteristics of Gd-loaded liquid scintillators BC521 and BC525", Nucl. Instr. and Meth. in Phys. Res. A—Accelerators, Spectrometers, Detectors,& Assoc. Equipment, vol. 580(#3), pp. 1383-1389, Oct. 2007.
K. Barbalace, "Periodic table of elements—sorted by cross section (thermal neutron capture)", accessed online Oct. 30, 2009, Jul. 18, 2012 http://EnvironmentalChemistry.com/yogi/periodic/crosssection.html.
J. Glodo et al., "$GdI_3$:Ce—A new gamma and neutron scintillator", Nuclear Science Symposium Conference Record vol. 3, IEEE, San Diego, CA, pp. 1574-1577 (2006).
L. Ovenchkina et al., "Gadolinium loaded plastic scintillators for high efficiency neutron detection", Physics Procedia, vol. 2, pp. 161-170 (2009).
B. Schillinger, "Neutron detectors using CCD cameras", in Proceedings International Workshop on position-sensitive neutron detectors, Jun. 28-30, 2001, Hahn-MeitnerInstitut, Berlin, Germany.
I. Shestakova et al., "A new sensor for thermal neutron imaging", IEEE Trans. Nucl. Sc., vol. 52(#4), pp. 1109-1113 (2005).

(Continued)

*Primary Examiner* — Constantine Hannaher

(57) ABSTRACT

A thermal neutron detector and method employ Gd-containing nanoscintillators. Thermal neutron radiation is detected by observing scintillation events from the nanoscintillators.

17 Claims, 14 Drawing Sheets

(56) References Cited

OTHER PUBLICATIONS

I. Shestakova et al., "A new scintillator structure for thermal nuetron imaging", Nucl. Instr. and Meth. in Phys. Res. B, vol. 263(#1), pp. 234-238 (2007).

M.L. Wald, "Shortage slows a program to detect nuclear bombs", The New York Times, Nov. 22, 2009.

F. Wang et al., "One-pot synthesis of chitosan/$LaF_3$:$Eu^{3+}$ nanocrystals for bio-applications", Nanotechnology, vol. 17, pp. 1527-1532, 2006.

* cited by examiner

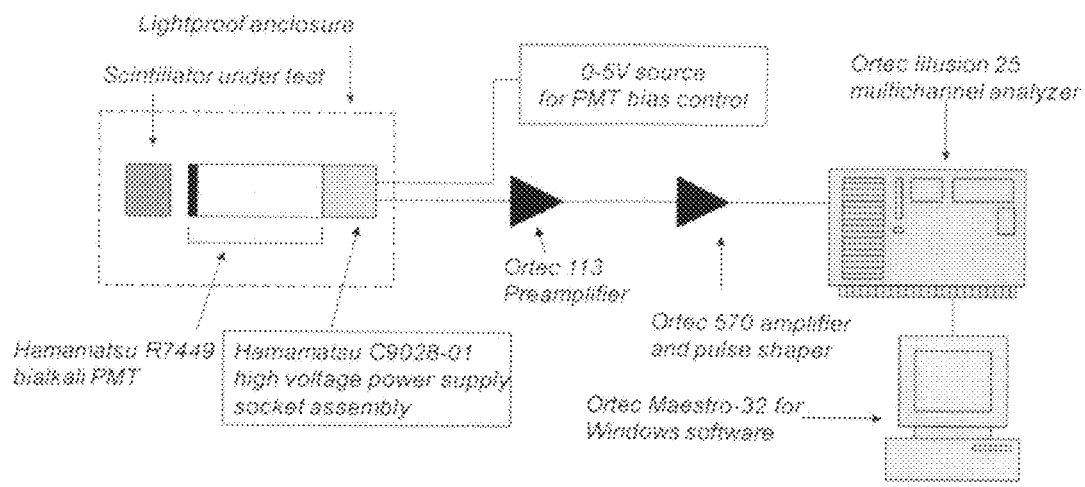
Fig. 8.
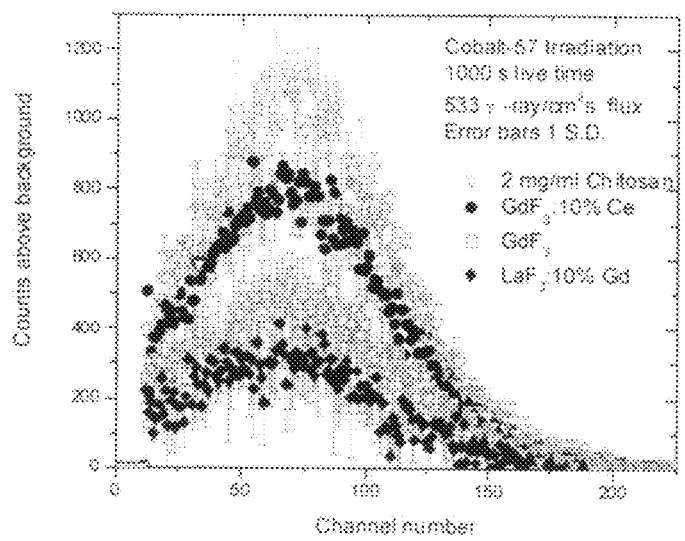
Fig. 9. Gamma ray detection results.

THERMAL NEUTRON DETECTORS BASED ON GADOLINIUM-CONTAINING NANOSCINTILLATORS

This application claims benefits and priority of U.S. provisional application Ser. No. 61/473,071 filed Apr. 7, 2011, the entire disclosure of which is incorporated herein by reference.

FIELD OF THE INVENTION

This invention relates to thermal neutron detectors and methods and, more particularly, to thermal neutron detectors and methods that employ gadolinium-containing nanoscintillators.

BACKGROUND OF THE INVENTION

Standard detectors of slow neutrons rely on the $^{10}B(n,\alpha)$, $^6Li(n,\alpha)$, or $^3He(n,p)$ reactions. The thermal neutron cross section for the $^{10}B(n,\alpha)$ reaction is 3840 barns, and the natural abundance of $^{10}B$ is 19.8%. The most common detector based on the boron reaction is a $BF_3$ gas tube. Boron-loaded scintillators are also used, although they encounter the challenge of discriminating between gamma rays backgrounds and gamma rays due to neutrons. The thermal neutron cross section for the $^6Li(n,\alpha)$ reaction is 940 barns, and the natural abundance of $^6Li$ is only 7.4%. This requires enrichment of $^6Li$ isotope, and increases the cost of the scintillators in which $^6Li$ is embedded. The thermal neutron cross section for the $^3He(n,p)$ reaction is 5330 barns, but its natural abundance of only 0.0001% results in even higher cost than $^6Li$.

A dramatic illustration of the burning need for improved detectors and methods for neutron detection is the recent crisis with the interrupted deployment of 1,300-1,400 $^3He$ neutron detectors (each costing $800,000) by the Department of Homeland Security (DHS) [Wald 2009]. After spending $230 million to develop those detectors, with the intent of installing them in ports around the world to monitor possible attempts to smuggle radioactive materials, DHS was forced to stop the deployment due to the shortage of $^3He$, with the demand exceeding the supply by a factor of 10.

Gadolinium has the highest thermal neutron absorption cross-section of any naturally occurring element. Two isotopes of Gd with very high thermal neutron absorption cross-sections are $^{157}Gd$ ($\sigma_n$=253,000 barns with 24.8% natural abundance) and $^{155}Gd$ ($\sigma_n$=60,700 barns with 14.8% natural abundance) [Sonzongi 2009]. Even without any isotopic enrichment, naturally occurring Gd has an average value of $\sigma_n$=49,000 barns [Barbalace 2009]. Gadolinium emits low-energy conversion electrons and atomic X-rays in over 50% of the neutron captures, which makes it a very attractive dopant for a variety of neutron detectors. In addition to low-energy (up to 80 keV) conversion electrons, capture of a thermal neutron produces a cascade of associated Auger electrons, X-rays, and gamma rays ranging in energy from few eV to several MeV. All these radiations are available to produce significant light output in a suitable efficient scintillating material.

Gd-containing organic liquid scintillators are commercially available [Banerjee 2007]. Like all liquid scintillators, however, they require very careful handling and must be stored and used in oxygen-free and water-free environment. Containers for these liquids must be sealed, and the liquids must be thoroughly bubbled with inert gas prior to sealing.

Very few literature references have been found for Gd-containing solid-state scintillators. They include gadolinium oxyorthosilicate $Gd_2O_3S$ (GOS) [Schillinger 2001], $GdF_3$ [Shestakova 2005], $Gd_2O_3$ [Shestakova 2007], $Gd_3$:Ce [Glodo 2006], and Gd-loaded plastic scintillators [Ovechkina 2009].

Colloidal nanocrystals (NCs) have attracted tremendous interest over the last few years for a wide range of biomedical, biochemical sensing, and optoelectronic applications. So far, however, their potential has largely eluded the nuclear detection community. In contrast to wide exploitation of quantum confinement effects in optoelectronic and electronic devices, the physics and technology of inorganic scintillators is still primarily limited to bulk materials.

Large single-crystal inorganic scintillators have high output efficiency, but are very fragile, expensive to grow, and the size of high-quality crystals is limited. Particulate scintillating semiconductors of micrometer size could bring scalability and robustness to the field of inorganic scintillators. Their use, however, is limited by their low solubility in organic and polymeric matrices, and when prepared in inorganic matrices, such as sol-gel, they produce an optically opaque gel, which significantly reduces scintillation output. The present invention envisons overcoming these limitations by using suspensions or composites of nanocrystalline materials. Due to their small size, NCs can have better solubility in organic and polymeric matrices, and cause much less scattering when loaded into inorganic sol-gel or porous host materials, which should result in higher efficiency of the scintillator. NCs of known and novel scintillation materials will allow for production of large robust nanocomposites with a variety of shapes and sizes.

SUMMARY OF THE INVENTION

The present invention provides a thermal neutron detector and method that employ Gd-containing nanoscintillators such that thermal neutron radiation can be detected by observing scintillation events of the nanoscintillators.

In an illustrative embodiment of the present invention, the Gd-containing nanoscintllators comprise Gd-containing lanthanide-halide compounds, which can include Gd-halide compounds and non-Gd lanthanide-halide compounds doped with Gd in an effective minor amount to exhibit observable scintillation in response to thermal neutron irradiation. The Gd-containing nanoscintllators are made in the form of nanoparticles or nanocrystals by colloidal synthesis, such as a co-precipitation colloidal synthesis. For the purposes of the invention, the terms nanoparticles and nanocrystals are used interchangeably.

Advantages and features of the present invention will become more apparent from the following drawings taken with the following detailed description of illustrative embodiments of the invention.

BRIEF DESCRIPTION OF THE DRAWINGS

(FIG. 1a) 50 nm; FIG. 1(b) 20 nm.

FIG. 8 is a block diagram of the amplification and pulse shaping system.

FIG. 9 shows the gamma ray detection results.

DETAILED DESCRIPTION OF THE INVENTION

Figure 1A:
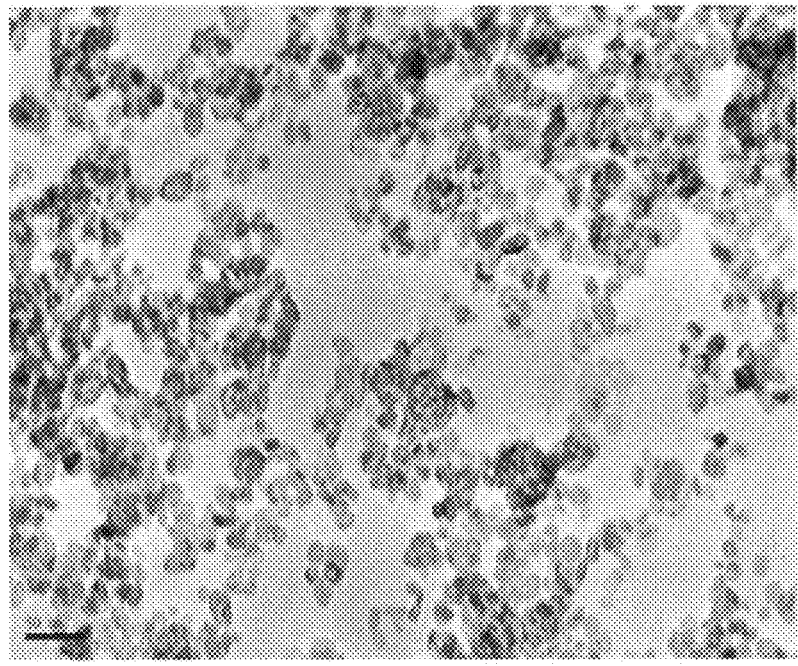
FIGS. 1a and 1b are high resolution TEM (transmission electrom microscopy) images of $LaF_3$:10% $Gd^{3+}$ NCs. Scale bars.

The present invention involves a thermal neutron detector and method that employ Gd-containing nanoscintillators wherein thermal neutron irradiation is detected by observing scintillation events of the nanoscintillators in practice of the present invention. Exemplary solid state Gd-containing nanoscintillators for use in practice of the invention comprise Gd-containing compounds, such as gadolinium halides(e.g. $GdF_3$), gadolinium oxides, and gadolinium garnets. The Gd-containing nanoscintillators can include Gd-containing compounds doped with other lanthanide elements (e.g. $GdF_3$ doped with Ce), and non-Gd lanthanide-containing compounds doped with Gd (e.g. $LaF_3$ doped with Gd) wherein Gd is present in an effective minor amount to exhibit observable scintillation in response to thermal neutron irradiation.

The Gd-containing nanoscintillators are employed in the form of nanoparticles or nanocrystals in a size range of about 1 nm to about 100 nm and are made pursuant to a method embodiment by a co-precipitation colloidal synthesis route. The thermal neutron detector can comprise the Gd-containing scintillating nanoparticles or nanocrystals as a dispersion of those in a liquid, such as water-based dispersion, or as a nanocomposite wherein the Gd-containing scintillating nanoparticles or nanocrystals are dispersed in a solid transparent matrix, such as a transparent polymer matrix.

Synthesis and Characterization of $LaF_3$:Gd, $GdF_3$ AND $GdF_3$:Ce Nanocrystals:

Nanocrystals comprised of $LaF_3$ doped with 10% Gd, $GdF_3$, and $GdF_3$ doped with 10% Ce were synthesized colloidally via co-precipitation method adapted from F. Wang, Y. Zhang, X. Fan, and M. Wang, "One-pot synthesis of chitosan/LaF3:Eu3+ nanocrystals for bio-applications", Nanotechnology, vol. 17, pp. 1527-1532, 2006 [Wang 2006], which is incorprated herein by reference to this end. The lanthanum chloride 99.999%, ammonium fluoride 99.999%, ammonia in methanol solution, hydrochloric acid, and chitosan medium molecular weight were all purchased from Sigma Aldrich. Gadolinium chloride 99.999% and cerium chloride 99.999% were purchased from MV Laboratories.

Synthesis of $LaF_3$:10% $Gd^{3+}$, $GdF_3$, and $GdF_3$:$Ce^{3+}$ Nanocrystals:

The following balanced chemical reaction is expected to occur at the nucleation phase of $LaF_3$:Gd NCs:

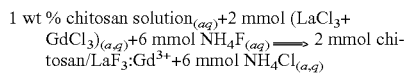

In order to keep the reaction under argon, a three-neck borosilicate glass was connected to a Schlenk line gas manifold. Nine (9) ml of 0.2M $LaCl_3$, 1 ml of 0.2M $GdCl_3$, and 10 ml of 0.6M $NH_4F$ were added to the three-neck flask along with 25 ml of 1 wt % chitosan solution at a pH of 2. The pH of the chitosan solution was modified using HCl as a way to achieve a stable mixture of $H_2O$ and chitosan. The pH of the reaction mixture was adjusted to 6.5 using ammonia in methanol solution and was allowed to react for 2 hours at 75° C. After allowing the reaction solution to cool to room temperature, it was collected as is, centrifuged at 4000 rpm, and washed in 0.5% acetic acid in $H_2O$ mixture. Afterwards, the NCs were redispersed in DI $H_2O$ and stabilized by adding 1 M HCl in $H_2O$ solution, bringing the sample to a pH of 2.5.

The following balanced chemical reaction is expected to occur at the nucleation phase of $GdF_3$ NCs:

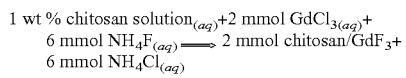

Ten (10) ml of 0.2M $GdCl_3$ was reacted with 10 ml of 0.6M $NH_4F$ in this procedure. Other than that, the synthesis procedure for $GdF_3$ NCs remained the same as that described above for $LaF_3$:Gd NCs.

The following balanced chemical reaction is expected to occur at the nucleation phase of $GdF_3$:Ce:

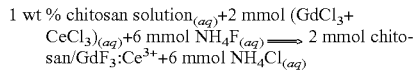

Nine (9) ml of 0.2M $GdCl_3$ and 1 ml of 0.2M $CeCl_3$ were reacted with 10 ml of 0.6M $NH_4F$ in order to obtain $GdF_3$:Ce NCs, and the synthesis continued along the lines of the previous two procedures.

Characterization of $LaF_3$:10% $Gd^{3+}$, $GdF_3$, and $GdF_3$:$Ce^{3+}$ Nanocrystals:

For structural characterization, TEM samples were prepared by placing a drop of the colloidal solution in a 200-mesh carbon coated copper grid and the solvent was allowed to dry, fixing the NCs on the grid. High-resolution transmission electron microscope, JEOL-2010F operating at 200 kV, was used with an Oxford Instruments 200 energy-dispersive spectroscopy (EDS) analytical system fitted with an Inca X-Site Ultra Thin Window EDS detector.

Figure 1B:
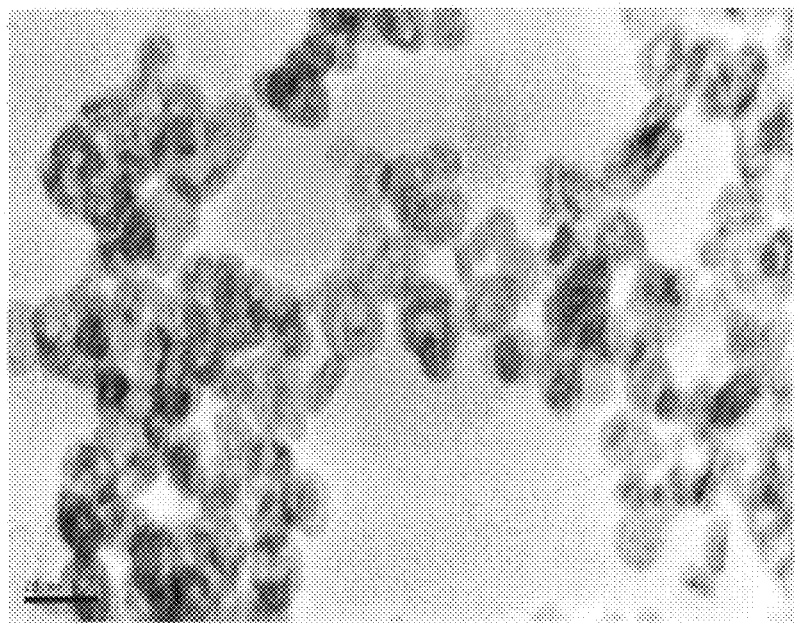
Figure 2:
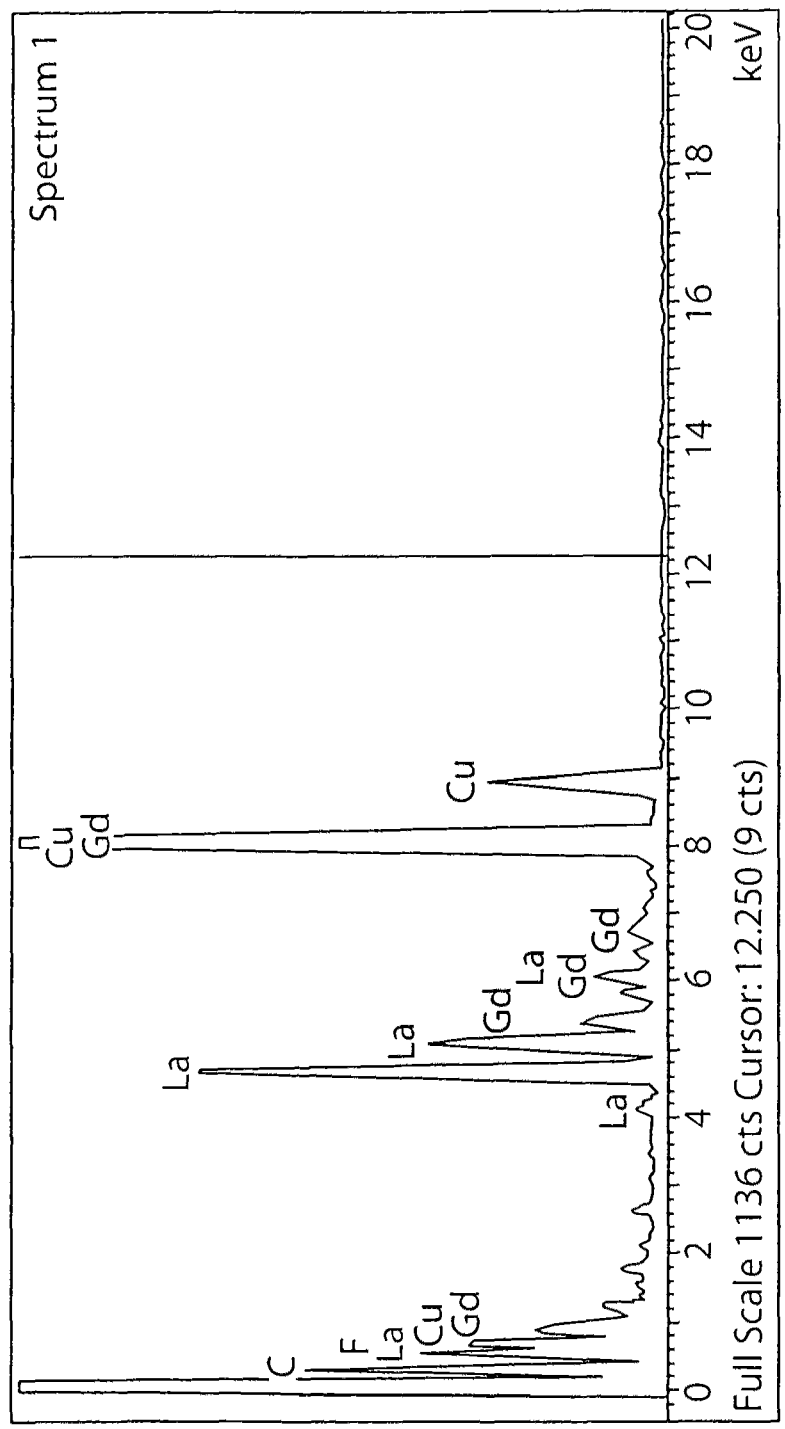
FIG. 2 is an EDS (energy dispersive spectroscopy) data for $LaF_3$:10% $Gd^{3+}$ NCs (nanocyrstals).
Figure 3A:
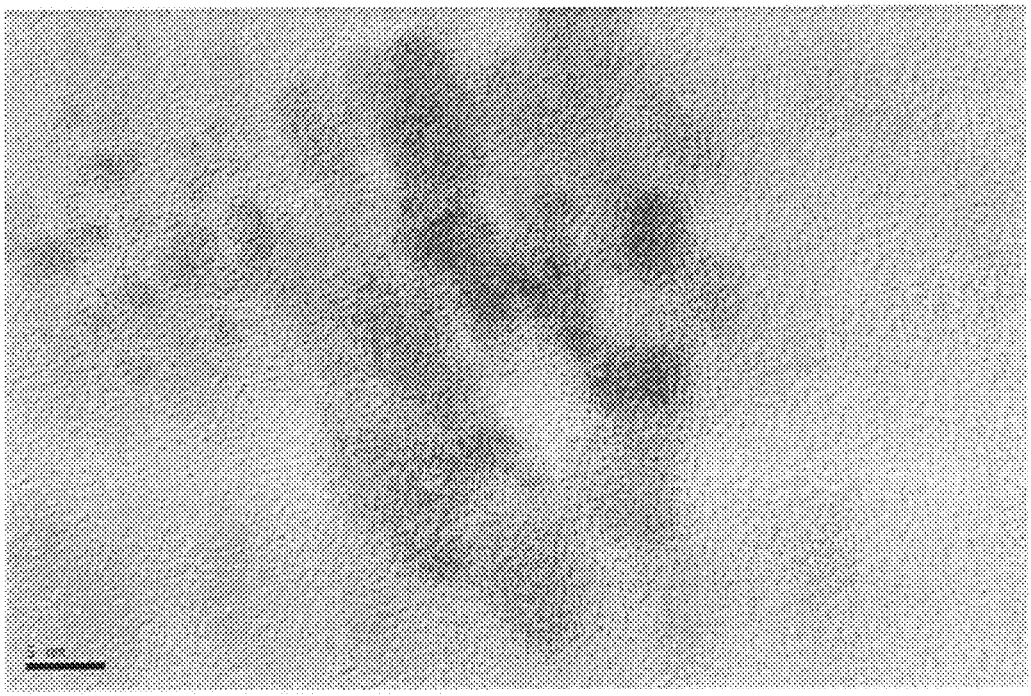
FIGS. 3a and 3b are high resolution TEM images of $GdF_3$ NCs with 5 nm scale bars.
Figure 3B:
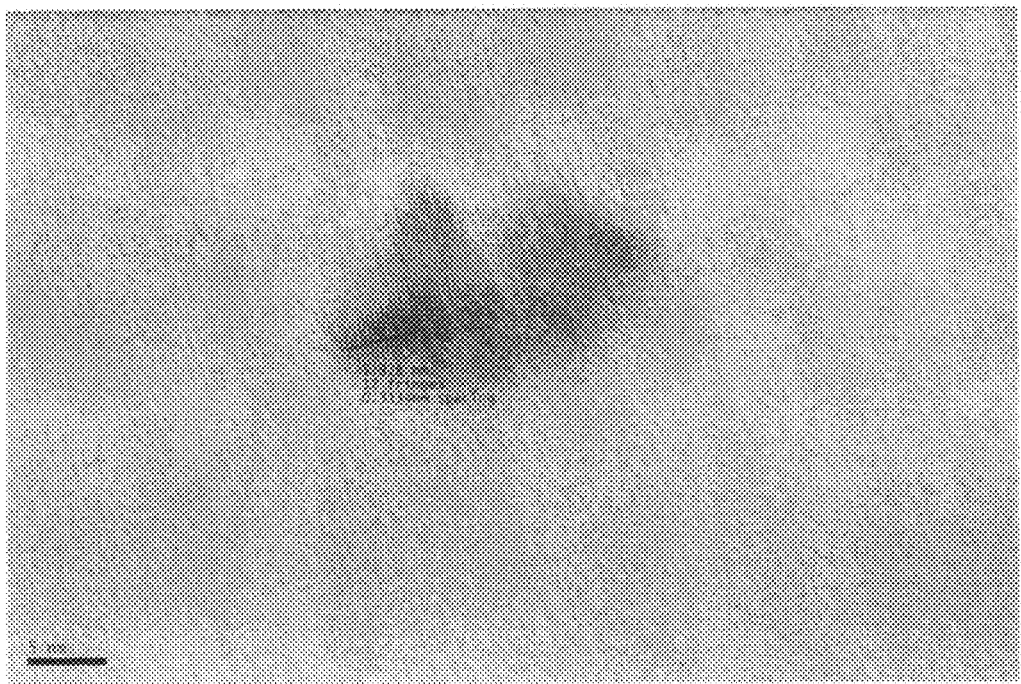
Figure 4:
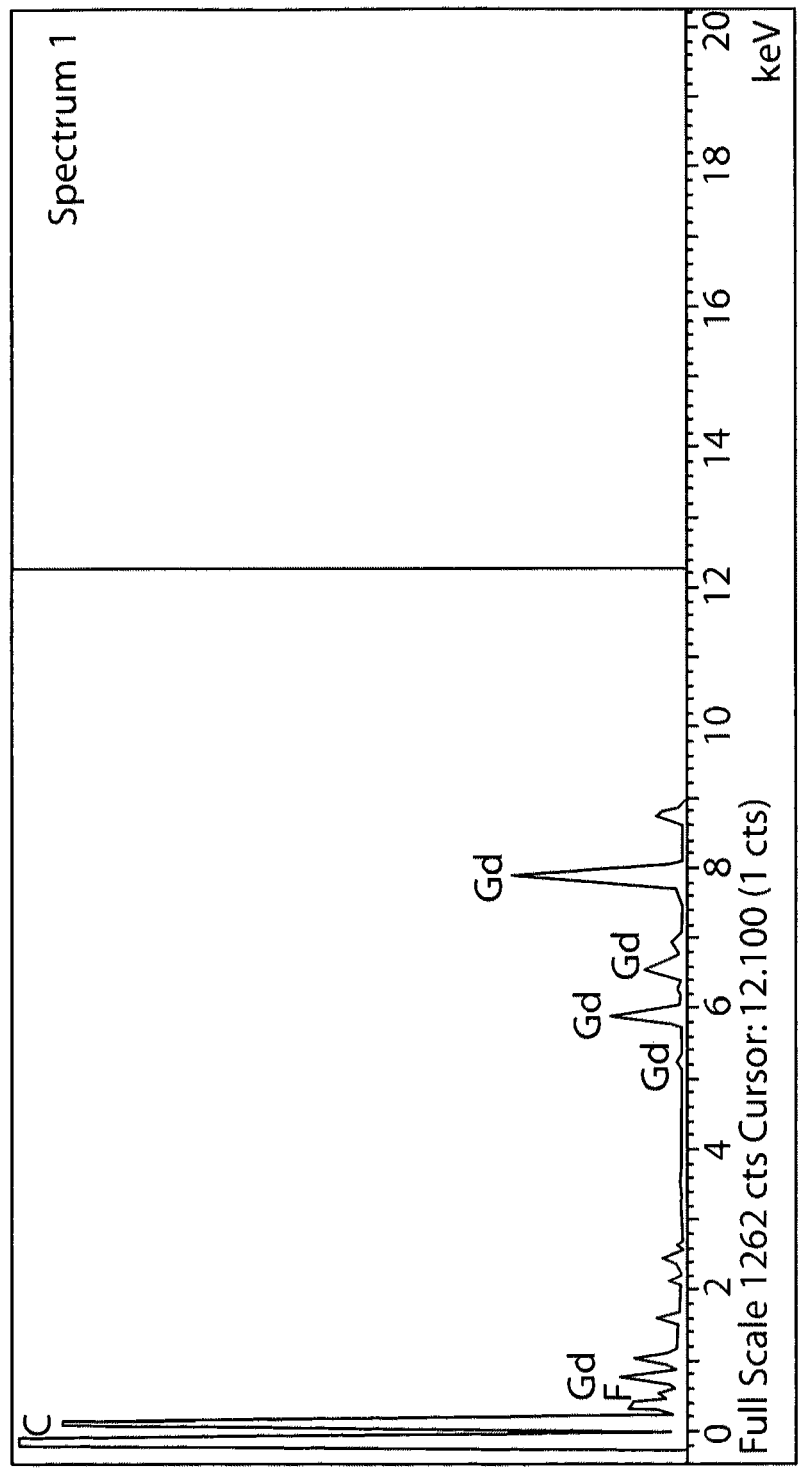
FIG. 4 is an EDS data for $GdF_3$ NCs.

High resolution images of $LaF_3$:10% $Gd^{3+}$ indicate successful formation of hexagonal platelet nanoparticles (FIGS. 1a, 1b). To get the energy dispersion spectrum (EDS) data, the electron beam was focused on a single NC and the peaks were identified using the Oxford Instruments ISIS software. The elemental presence of La, F, and Gd in the composition of the synthesized nanoparticles was verified from the EDS spectrum shown in FIG. 2. The Cu and C peaks originate from the holding grid. Similar TEM analysis was carried out on the $GdF_3$ NCs. Imaging of crystalline fringes in the $GdF_3$ sample indicates successful NC formation (FIGS. 3a, 3b). The EDS spectrum shown in FIG. 4 confirms the elemental presence of Gd and F in the sample.

Figure 5A:
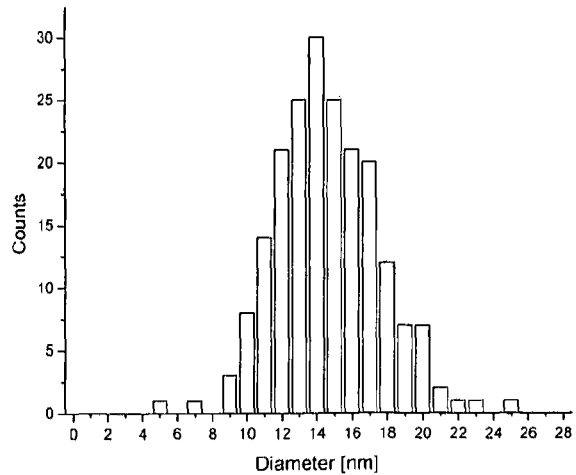
FIGS. 5a, 5b, and 5c show size distribution of (FIG. 5a) $LaF_3$:10% $Gd^{3+}$, (FIG. 5b) $GdF_3$, and (FIG. 5c) $GdF_3$:10% $Ce^{3+}$ NCs as obtained from DLS (dynamic light scattering) analysis.
Figure 5B:
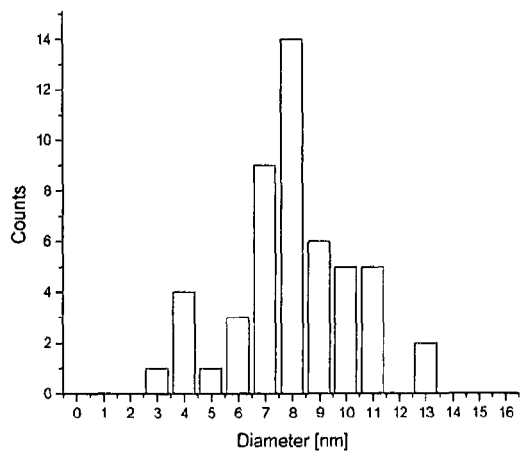
Figure 5C:
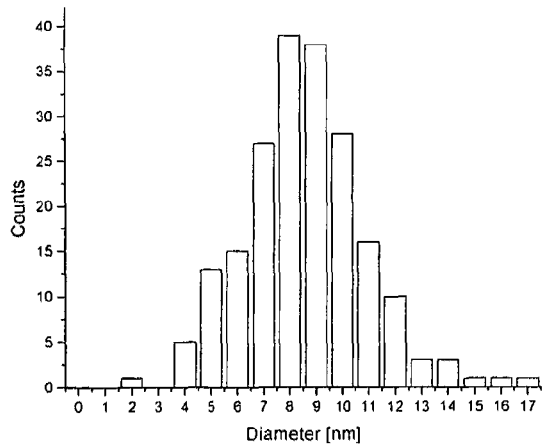

Dynamic light scattering (DLS) analysis provides information about hydrodanamic size of particles, which also accounts for any ligand molecules modifying the surface of the nanoparticles. DLS measurements were taken with a DynaPro Titan dynamic light scattering module from Wyatt Technology Corporation. FIGS. 5a, 5b, and 5c show the hydrodynamic size distributions for $LaF_3$:10% $Gd^{3+}$, $GdF_3$, and $GdF_3$:10% $Ce^{3+}$ NCs, respectively.

The DLS measurements of LaF$_3$:10% Gd$^{3+}$ NCs (FIG. 5a) reveal a size distribution about 10 nm wide with an average hydrodynamic size of 14 nm. In the case of GdF$_3$ NCs (FIG. 5b), DLS measurements suggest the presence of NCs with a 7 nm wide hydrodynamic size distribution with a peak diameter of 8 nm. The size distribution for GdF$_3$:Ce$^{3+}$ NCs obtained from DLS analysis (FIG. 5c) is similar to that of undoped GdF$_3$ NCs.

Figure 6:
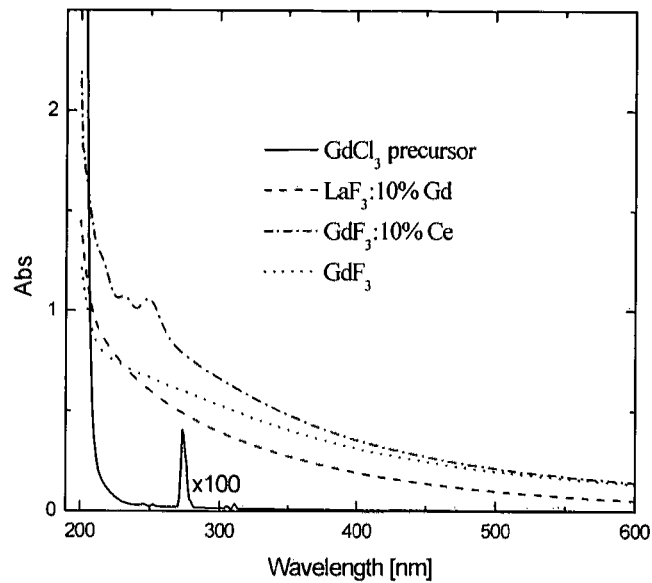
FIG. 6 shows absorption spectra of $GdCl_3$ precursor, $LaF_3$:$Gd^{3+}$, $GdF_3$, and $GdF_3$:$Ce^{3+}$ NCs corrected for their actual concentrations.
Figure 7:
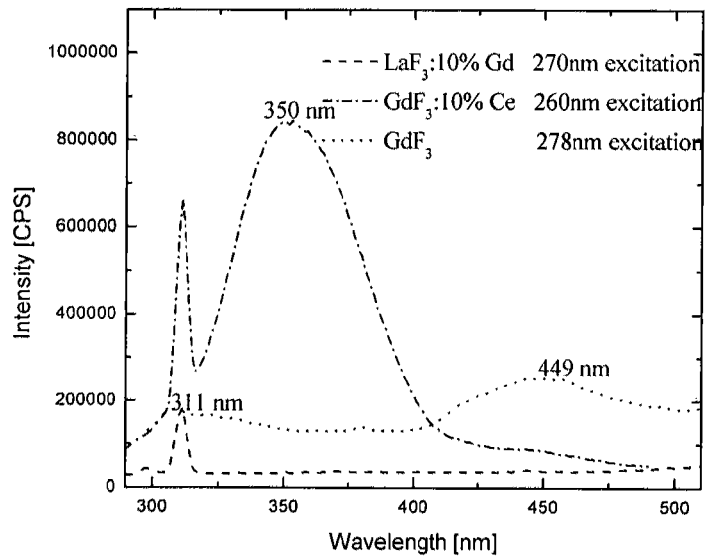
FIG. 7 shows the PL (photoluminescence) emission spectra of $LaF_3$:$Gd^{3+}$, $GdF_3$, and $GdF_3$:$Ce^{3+}$ NCs.

Absorption measurements were performed on a Varian Cary-5000-UV-VIS-NIR spectrophotometer. Corrected for their actual concentrations determined from calcination experiments, the absorption spectra for the LaF$_3$:10% Gd$^{3+}$, GdF$_3$, and GdF$_3$:Ce$^{3+}$ NC samples are shown in FIG. 6. Absorption spectrum of GdCl$_3$ precursor is shown for comparison. Photoluminescence spectra were measured with a Horiba JobinYvon Fluorolog-3 spectrofluorometer. The optimal excitation wavelengths of 270 nm, 278 nm, and 260 nm for the LaF$_3$:10% Gd$^{3+}$, GdF$_3$, and GdF$_3$:Ce$^{3+}$ NCs were determined from PL excitation spectroscopy measurements. The PL emission spectra of FIG. 7 for the corresponding NCs were taken at those optimal excitation wavelengths.

A single narrow emission line at about 311 nm was observed in the LaF$_3$:10% Gd$^{3+}$ NC sample, which was ascribed to emission of Gd$^{3+}$ ions in the LaF$_3$ host matrix. The same emission line was also observed in the GdF$_3$:Ce$^{3+}$ NC sample along with much wider emission line centered around 350 nm. The latter was identified as emission of Ce$^{3+}$ ions in the GdF$_3$ host matrix. No pronounced emission peak related to Gd$^{3+}$ ion emission was observed in the undoped GdF$_3$ NC sample, which suggests energy transfer between Ce$^{3+}$ and Gd$^{3+}$ in the GdF$_3$:Ce$^{3+}$ NC sample.

Experiments on Gamma Ray and Neutron Detection:

For both the gamma-ray and neutron detection experiments, the same amplification and pulse shaping system was used to record scintillation events. A schematic of the scintillation detection system is shown in FIG. 8. Light was collected with a Hamamatsu R7449 bi-alkali photomultiplier tube (PMT), with a quartz front window providing sensitivity up to 185 nm in the deep ultraviolet. A Hamamatsu C90280-01 socket assembly accommodated both high voltage supply that could be adjusted from 0 to 1,250 V and resistance ladder for the dynodes in the PMT. The data from the PMT collected during experiments were analyzed using Maestro-32 Ortec pulse height discriminator for gamma-ray spectroscopy.

The hardware included an Ortec 113 transimpedance preamplifier, an Ortec 570 amplifier with RCCR pulse shaping and an MCA emulator with TRUMP-PCI card for multichannel pulse-height analysis. All measurements were taken for 1,000 s of live time. In order to allow the multichannel analyzer to accurately measure the peak height, all tests were performed with the RC time constants of the differentiating and integrating networks set to 2 µs. The pulses were amplified 200 times (V/V), which provided sufficient resolution to detect a single-photon peak.

Experimental Setup for Gamma Ray Measurements:

The scintillation materials under test were contained in a cylindrical quartz cuvette with a path length of 20 mm between two polished windows and an inner diameter of 19 mm, containing approximately 5.6 ml of fluid sample. The rear window and curved surfaces of the cuvette were covered with teflon tape to reflect scintillation light into the PMT. Optical grease was used to reduce reflection between the cuvette and the PMT, and the cuvette was held in place with a lens holder.

At the time of measurement, a 0.768 µCi (28,400 Bq) 3 mm-radius $^{57}$Co disc source was placed 6 mm behind the rear wall of the cuvette for a total distance of 18.75 mm between the radioactive source and the mid-plane of the scintillation fluid. A flux of 3,800 γ-ray/cm$^2$ s was estimated at the mid-plane of the scintillation fluid sample under test.

Gamma Ray Detection Experiments:

For the gamma-ray detection experiments, the bias voltage on the PMT was set to 910 V, and each 1,000-s live time measurement was repeated 2-3 times to provide standard deviation error bars. The results, shown in FIG. 9, are represented as counts above background, with the results of background measurement subtracted from the results in presence of the $^{57}$Co gamma source. The error bars are the geometric sum of the background measurement error and the measurement error under $^{57}$Co irradiation. Contrary to what was expected, all of the gadolinium-containing nanocrystalline samples showed less response than the control sample of 2 mg/ml chitosan solution. A current hypothesis is that these low count levels are due to high self-absorption in UV region in the NC samples, as evidenced by the absorption spectra in FIG. 6, although applicants do not wish or intend to be bound by any theory in this regard.

Thermal Neutron Experimental Setup:

For the detection of neutrons, a 2.29 mCi $^{252}$Cf source was used, generating approximately 8.45×10$^7$ neutrons/s at varying kinetic energies. The source was placed in a 10-inch diameter polyethylene sphere used as a moderator, providing a thermal neutron source. Two 1"×1"×1" pieces of 5% borated polyethylene were used to provide neutron shielding, one piece to lower the neutron dose received by the electronics, and a second removable piece to attenuate neutron flux (but not gamma rays) received by the scintillator. The sphere and borated polyethylene slabs were mounted on an optical table. The photomultiplier tube was repackaged into a smaller light-proof enclosure in order to facilitate moving the PMT and scintillator under test away from the powerful $^{252}$Cf source for loading a different scintillation material, thus minimizing the human exposure time. A custom kinematic mount allowed the PMT to be returned in exactly the same position each time, in order to maintain the geometry of the experiment.

The strong neutron source provided about 35 mrem/hr dose rate for neutrons and about 3 mrem/hr dose rate for gamma rays at 30 cm distance, and precautions were taken to protect personnel and equipment. When a sheet of borated polyethylene was placed between the source and the detector, the measured neutron dose rate dropped from initial 35 mrem/hr to 7 mrem/hr, attenuating approximately 80% of the neutron flux. In a rough geometry study of the experimental area, neglecting neutron diffusion, the size of the neutron shielding area that the borated polyethylene would provide was determined, and the electronics were placed in that area. Since the neutron source was significantly farther away from the cuvette containing the scintillating NCs, 239 mm versus 18.75 mm as compared to the gamma response experiments, the point source approximation was used for calculating neutron flux. The calculated solid angle of 0.00496 sr resulted in a neutron flux of about 11,800 neutrons/cm$^2$-s.

Figure 10A:
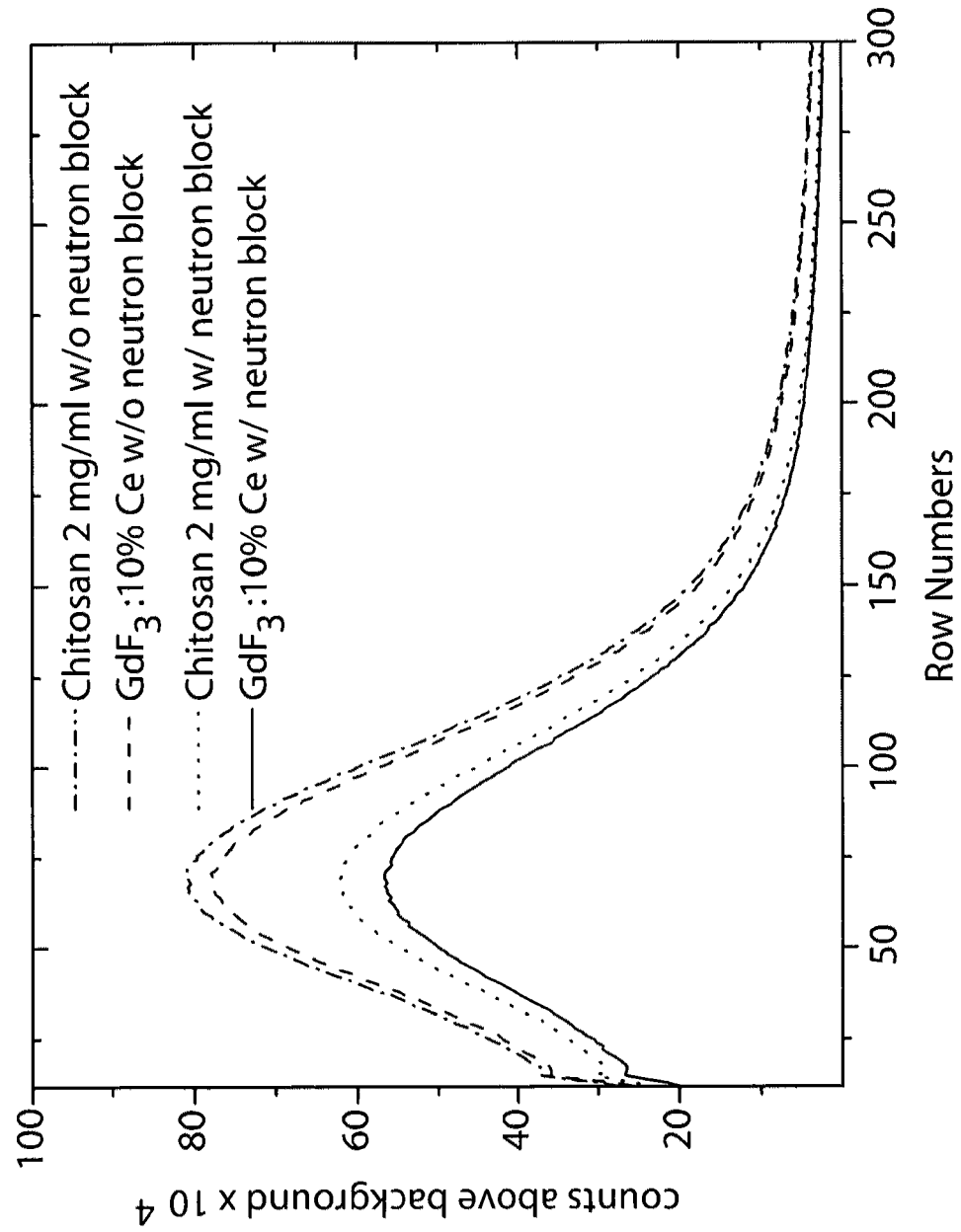
FIGS. 10a, 10b, 10c show neutron detection results for $GdF_3$:10% Ce (FIG. 10a), $LaF_3$:10% Gd (FIG. 10b), and $GdF_3$ (FIG. 10c) NCs.
Figure 10B:
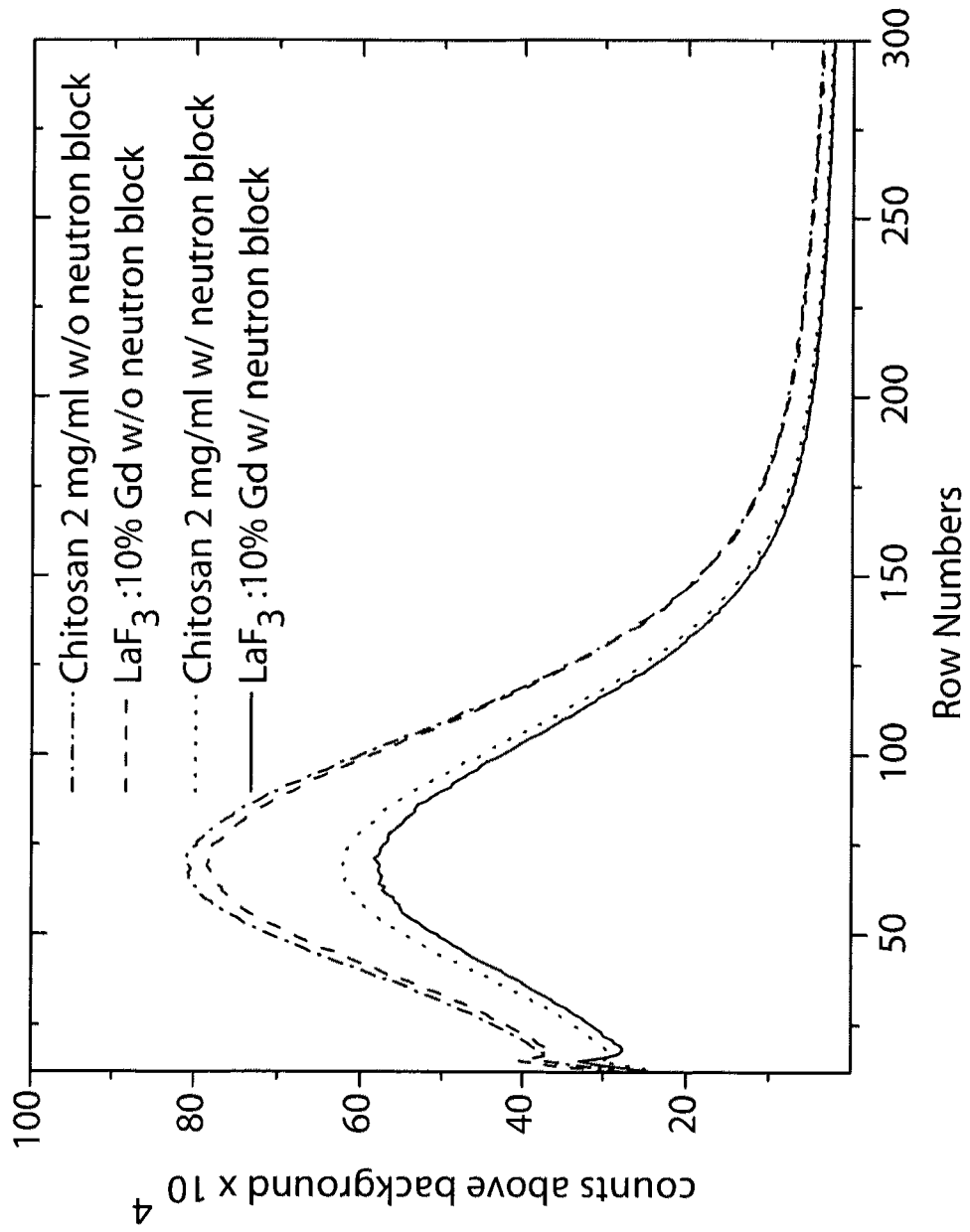
Figure 10C:
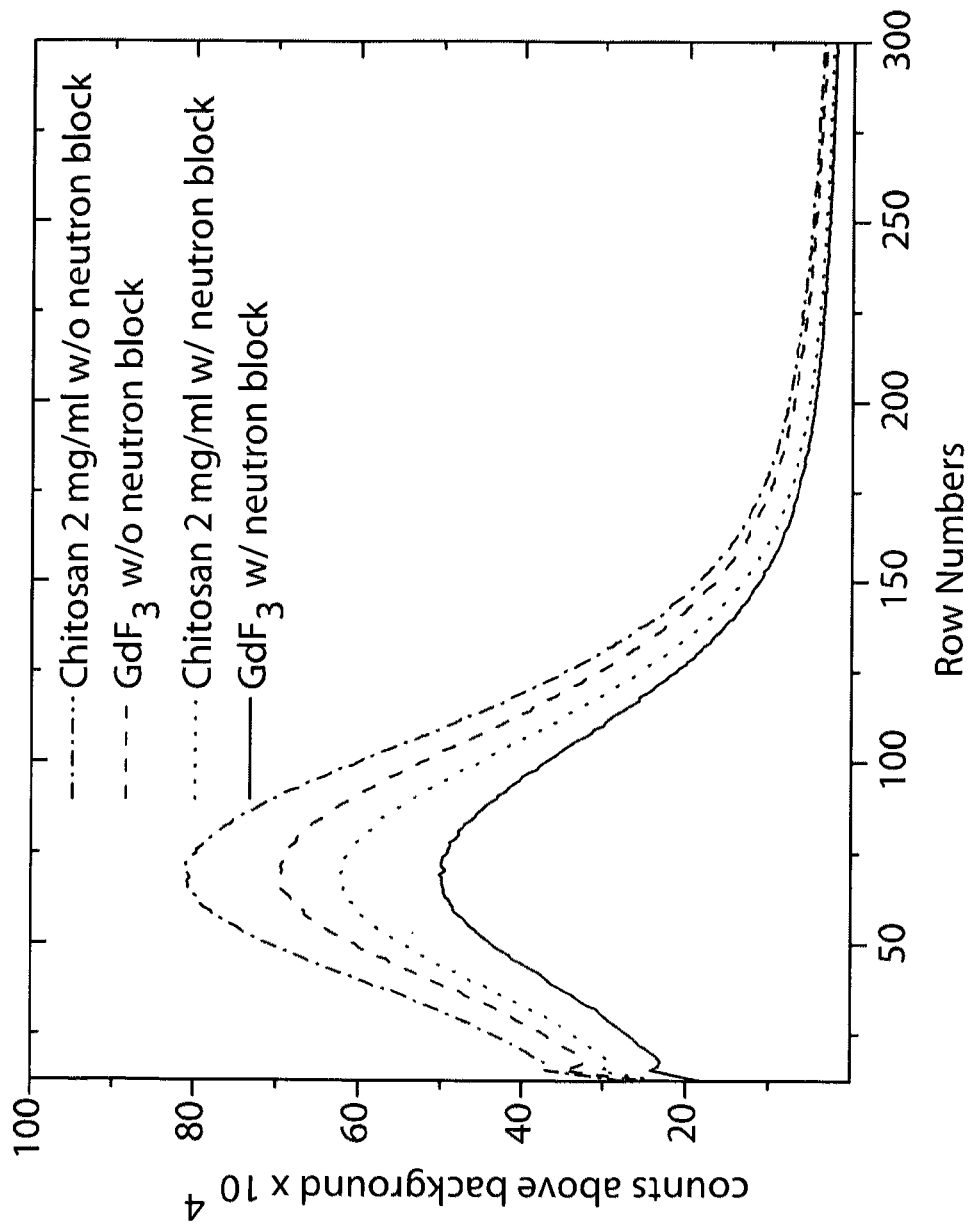

Neutron Detection Results:

Three sets of measurements were taken for each of the three Gd-containing NC material samples and the control sample of 2 mg/ml chitosan solution. First, a background measurement was taken with the neutron source removed from the experimental setup. In the second measurement, the neutron source was blocked with a sheet of the borated polyethelene placed between the source and NC scintillating material, and in the final measurement there was no neutron block between the source and NC scintillating material under test. The background-subtracted results of these experiments are shown in FIGS. 10a, 10b, and 10c.

Figure 11A:
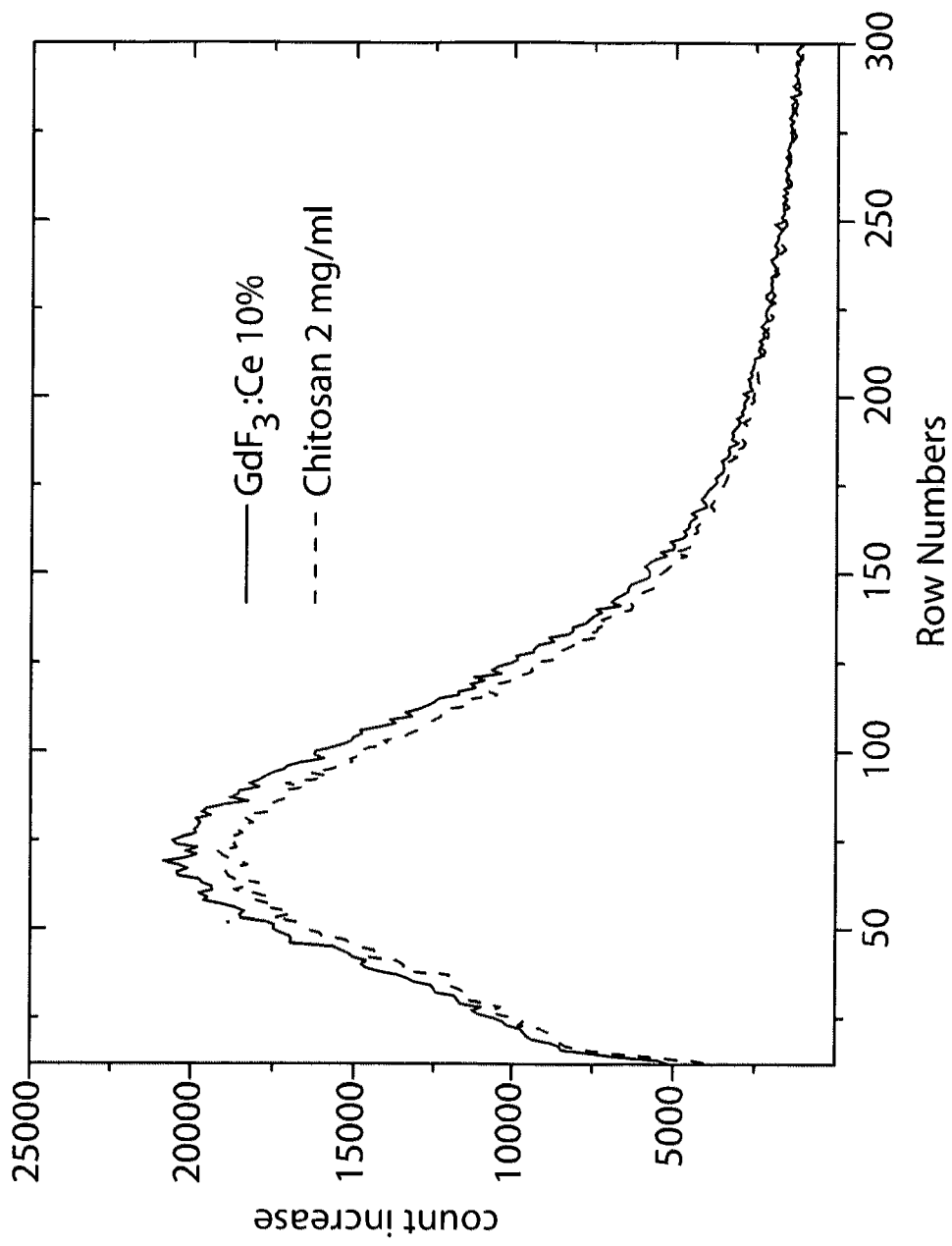
FIGS. 11a, 11b, 11c show the increase in counts in unshielded $GdF_3$:10% Ce (FIG. 11a), $LaF_3$:10% Gd (FIG. 11b), and $GdF_3$ (FIG. 11c) NC samples versus similar increase in counts in unshielded control sample of 2 mg/ml chitosan solution.
Figure 11B:
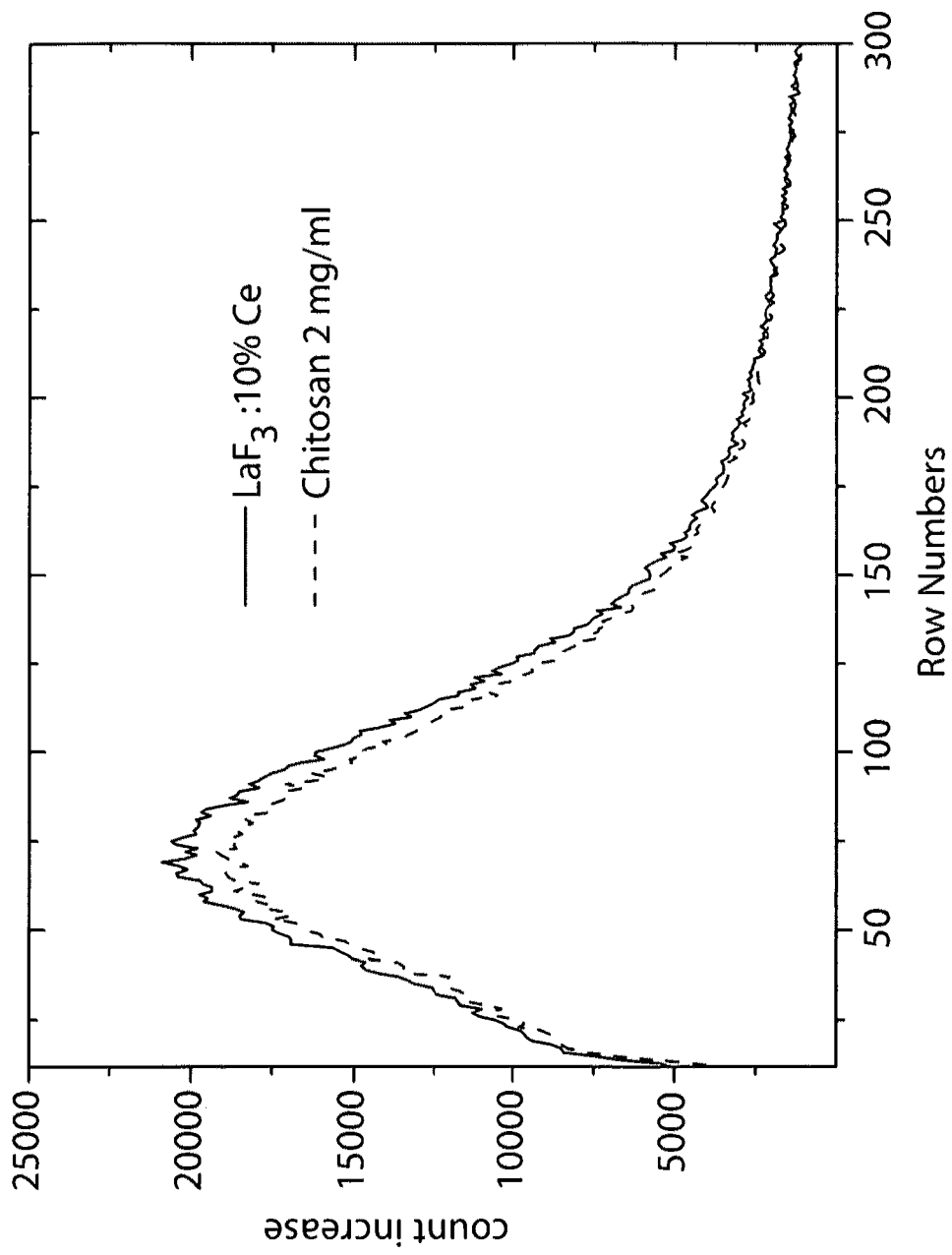
Figure 11C:
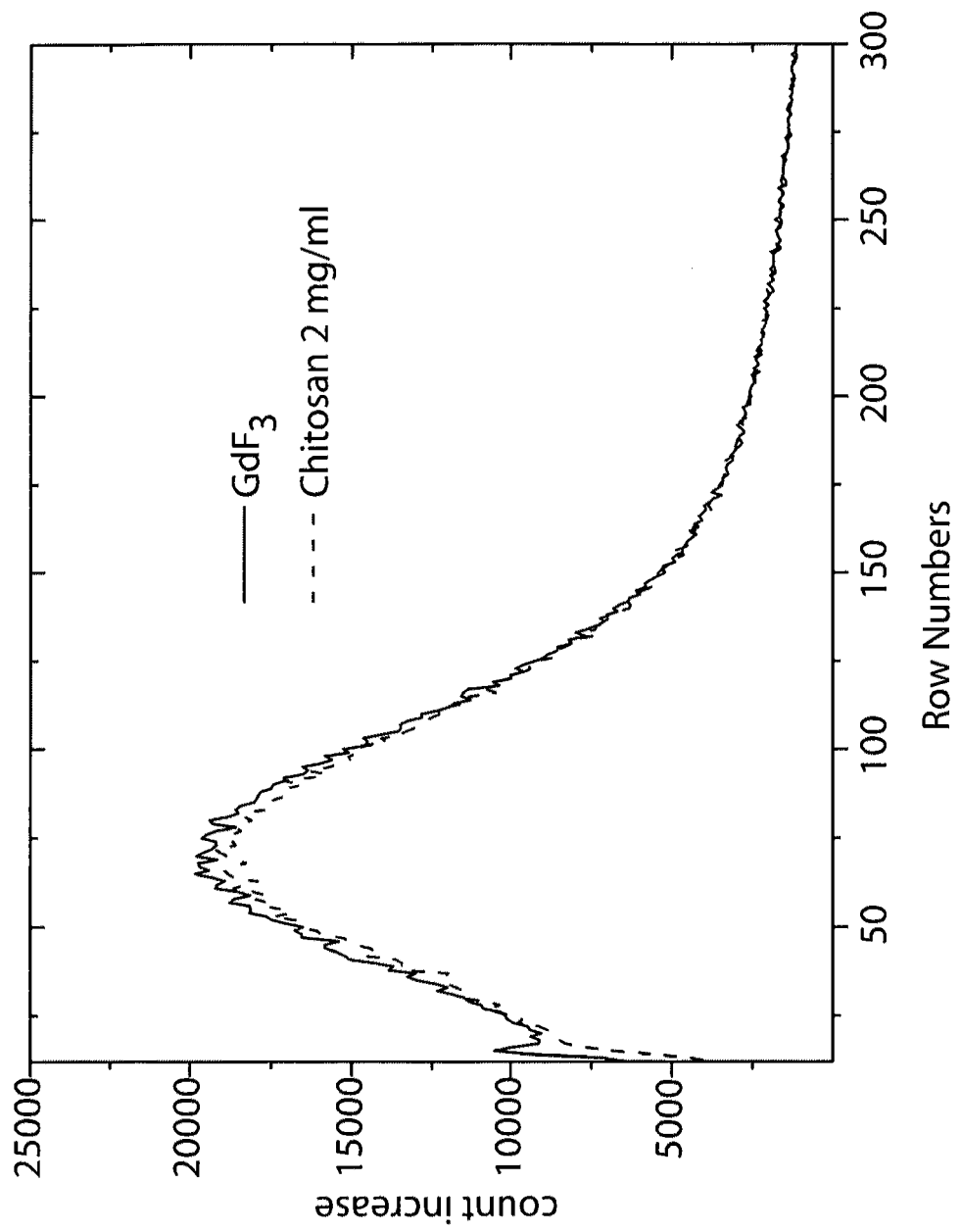

All of the Gd-containing NC's materials showed fewer absolute counts than the control chitosan solution, which was consistent with the results from the gamma ray detection experiments and was attributed to high levels of self-absorption in the material. The important observation, however, was the increased counts detected from all three unshielded Gd-containing NC materials in comparison with a similar increase in counts detected from unshielded control sample of 2 mg/ml chitosan solution (FIGS. 11a, 11b, 11c). In all three cases, the Gd-containing NC materials showed a larger change in counts than the chitosan control sample. Since borated polyethylene is an electron-poor material, it is assumed that the gamma ray flux is largely unaffected by it. The larger change in count rates in Gd-containing NC materials is therefore due to the absorption and detection of thermalized neutrons by Gd-containing nanocrystals.

The examples above demonstrate that gadolinium-containing $LaF_3$:10% $Gd^{3+}$, $GdF_3$, and $GdF_3$:10% $Ce^{3+}$ scintillating nanocrystals can be used for neutron detection applications. That is, neutron detection has been confirmed in the above examples with Gd-containing nanocrystalline material irradiated with $^{252}Cf$ neutron source. Moreover, these nanocrystals can be produced through robust and flexible co-precipitation colloidal synthesis route described above and represent a major breakthrough in that there have been no prior reports of colloidal synthesis of Gd-containing NCs.

Figure 12:
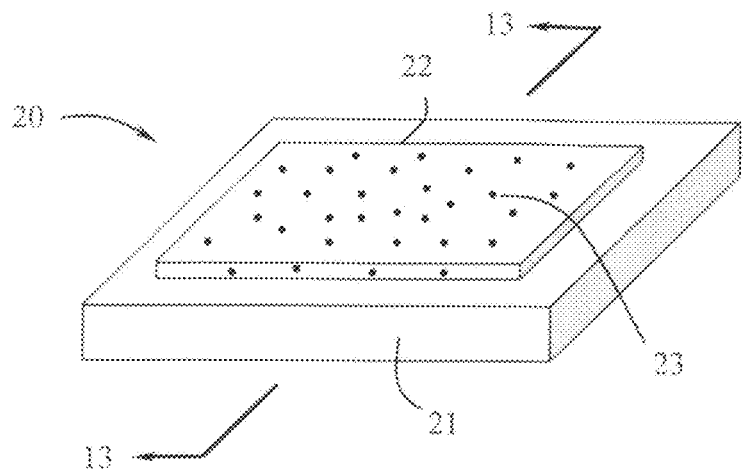
FIG. 12 shows a perspective view of a preferred embodiment of thermal neutron detector according to this invention.
Figure 13:
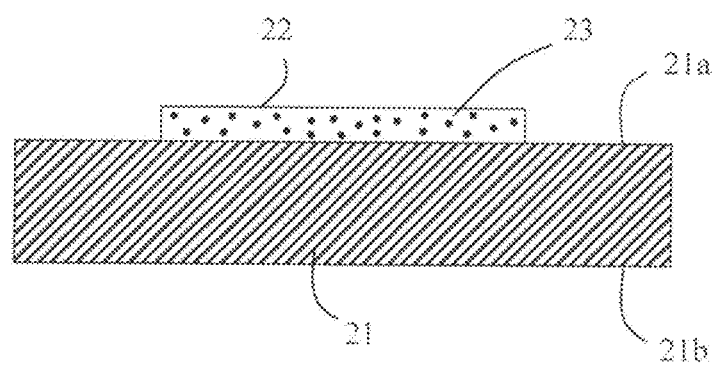
FIG. 13 shows an enlarged side cross sectional view of the thermal-neutron detector of FIG. 12.

Composite Detector Materials:

The present invention envisions incorporating the above-described Gd-containing NCs in a host matrix such as polymer or glass to form a composite material that will be employed as gamma detector and thermal neutron detector. For example, FIG. 12 illustrates a preferred embodiment of thermal neutron detector 20 according to this invention. The detector comprises a substrate 21 and a transparent polymer layer 22 with the Gd-containing NCs 23 dispersed in the layer 22 (matrix), which is connected to the substrate 21. The polymer layer can have a thickness in the range of 100 microns to 2 mm for purposes of illustration and not limitation. Substrate 21 can be made from a variety of materials, such as transparent glasses. A transparent substrate material allows the scintillation photons to be detected either from the polymer side 21a or from the back side 21b (FIG. 13). The substrate 21 and polymer 22 can have dimensions, such as 5×5 mm for purposes of illustration and not limitation, to provide a miniature thermal neutron detector.

Although the present invention has been described in connection with certain illustrative embodiments for purposes of illustration, those skilled in the art will appreciate that changes and modifications can be made therein without departing from the spirit and scope of the invention as set forth in the appended claims.

References, which are incorporated herein by reference:

[Banerjee 2007] K. Banerjee, S. Kundu, S. Mukhopadhyay, T. K. Rana, S. Bhattacharya, C. Bhattacharya, S. R. Banerjee, T. K. Ghosh, G. Mukherjee, T. Bandyopadhyay, A. Dey, J. K. Meena, P. Mukhopadhyay, D. Gupta, S. Pal, D. Pandit, and S. Bhattacharya, "Characteristics of Gd-loaded liquid scintillators BC521 and BC525", Nucl. Instr. and Meth. in Phys. Res. A—Accelerators, Spectrometers, Detectors, & Assoc. Equipment, vol. 580 (#3), pp. 1383-1389, 11 Oct. 2007.

[Barbalace 2009] K. Barbalace, "Periodic table of elements—sorted by cross section (thermal neutron capture)", accessed online Oct. 30, 2009, Environmental Chemistry.com/yogi/periodic/crosssection.html.

[Glodo 2006] J.Glodo, W. M. Higgins, E. V. D. van Loef, K. S. Shah, "$GdI_3$:Ce—A new gamma and neutron scintillator", Nuclear Science Symposium Conference Record Vol. 3, IEEE, San Diego, Calif., pp. 1574-1577 (2006).

[Ovechkina 2009] L. Ovechkina, K. Riley, S. Miller, Z. Bell, V. Nagarkar,"Gadolinium loaded plastic scintillators for high efficiency neutron detection", Physics Procedia, vol. 2, pp. 161-170 (2009).

[Schillinger 2001] B. Schillinger, "Neutron detectors using CCD cameras", in Proceedings International Workshop on position-sensitive neutron detectors, 28-30 Jun. 2001, Hahn-Meitnerinstitut, Berlin, Germany.

[Shestakova 2005] I. Shestakova, S. V. Tipnis, V. Gaysinskiy, J. J. Antal, L. Bobek, V. V. Nagarkar, "A new sensor for thermal neutron imaging", IEEE Trans. Nucl. Sc., vol. 52 (#4), pp. 1109-1113 (2005).

[Shestakova 2007] I. Shestakova, V. Gaysinskiy, J. Antal, L. Bobek, V. V. Nagarkar, "A new scintillator structure for thermal neutron imaging", Nucl. Instr. and Meth. in Phys. Res. B, vol. 263 (#1), pp. 234-238 (2007).

[Sonzongi 2009] A. Sonzongi, "Nudat 2.5", nndc.bnl.gov/nudat2/, Online Database.

[Wald 2009] M. L. Wald, "Shortage slows a program to detect nuclear bombs", The New York Times, 22 Nov. 2009.

[Wang 2006] F. Wang, Y. Zhang, X. Fan, and M. Wang, "One-pot synthesis of chitosan/$LaF_3$:$Eu^{3+}$ nanocrystals for bio-applications", Nanotechnology, vol. 17, pp. 1527-1532, 2006.

We claim:

1. A method for detection of thermal neutrons, comprising observing scintillation events from neutron-irradiated Gd-containing nanoscintillators in the form of nanoparticles or nanocrystals that comprise at least one of gadolinium oxide and a non-Gd lanthanide oxide doped with Gd and that when irradiated with thermal neutrons exhibit light-emitting scintillation events, wherein the nanoparticles or nanocrystals are dispersed in a transparent solid host matrix.

2. The method of claim 1 wherein the nanoparticles or nanocrystals have a lateral dimension in a size range of 1 nm to 100 nm.

3. The method of claim 1 wherein the nanoparticles or nanocrystals comprise the gadolinium oxide doped with another lanthanide element.

4. The method of claim 1 wherein the nanoparticles or nanocrystals are made by co-precipitation colloidal synthesis.

5. The method of claim 1 wherein the scintillation events are observed by counting the events.

6. A detector for detection of thermal neutrons, comprising Gd-containing nanoscintillators that comprise nanoparticles or nanocrystals that comprise at least one of gadolinium oxide and non-Gd lanthanide oxide doped with Gd and that when irradiated with thermal neutrons exhibit light-emitting scintillation events, wherein the nanoparticles or nanocrystals are dispersed in a transparent solid host matrix.

7. The detector of claim 6 further including a device for counting scintillation events.

8. The detector of claim 6 wherein the nanoparticles or nanocrystals have a lateral dimension in a size range of 1 nm to 100 nm.

9. The detector of claim 6 wherein the nanoparticles or nanocrystals comprise the gadolinium oxide doped with another lanthanide element.

10. A method for detection of thermal neutrons, comprising observing scintillation events from neutron-irradiated Gd-containing nanoscintillators in the form of nanoparticles or nanocrystals that comprise at least one of gadolinium garnet and a non-Gd lanthanide garnet doped with Gd and that when irradiated with thermal neutrons exhibit light-emitting scintillation events, wherein the nanoparticles or nanocrystals are dispersed in a transparent solid host matrix.

11. The method of claim 10 wherein the nanoparticles or nanocrystals have a lateral dimension in a size range of 1 nm to 100 nm.

12. The method of claim 10 wherein the nanoparticles or nanocrystals comprise the gadolinium garnet doped with another lanthanide element.

13. The method of claim 10 wherein the nanoparticles or nanocrystals are made by co-precipitation colloidal synthesis.

14. The method of claim 10 wherein the scintillation events are observed by counting the events.

15. A detector for detection of thermal neutrons, comprising Gd-containing nanoscintillators that comprise nanoparticles or nanocrystals that comprise at least one of gadolinium garnet and non-Gd lanthanide garnet doped with Gd and that when irradiated with thermal neutrons exhibit light-emitting scintillation events, wherein the nanoparticles or nanocrystals are dispersed in a transparent solid host matrix.

16. The detector of claim 15 further including a device for counting scintillation events.

17. The detector of claim 15 wherein the nanoparticles or nanocrystals have a lateral dimension in a size range of 1 nm to 100 nm.

* * * * *

UNITED STATES PATENT AND TRADEMARK OFFICE
CERTIFICATE OF CORRECTION

| | | |
|---|---|---|
| PATENT NO. | : 9,116,246 B2 | Page 1 of 1 |
| APPLICATION NO. | : 13/506240 | |
| DATED | : August 25, 2015 | |
| INVENTOR(S) | : Marek A. Osinski et al. | |

It is certified that error appears in the above-identified patent and that said Letters Patent is hereby corrected as shown below:

Specification

After the first paragraph (at column 1, after line 8), insert the following paragraph:

--CONTRACTUAL ORIGIN OF THE INVENTION

This invention was made with government support under Grant Nos. HOTRA-1-08-1-0021 and DTRA01-03-D-0009 awarded by the Department of Defense, Defense Threat Reduction Agency, and under Grant No. IIS0610201 awarded by the National Science Foundation. The Government has rights in the invention.--

Signed and Sealed this
Seventh Day of June, 2016

Michelle K. Lee
*Director of the United States Patent and Trademark Office*